(12) United States Patent
Sylvain

(10) Patent No.: US 8,233,026 B2
(45) Date of Patent: Jul. 31, 2012

(54) SCALABLE VIDEO ENCODING IN A MULTI-VIEW CAMERA SYSTEM

(75) Inventor: Dany Sylvain, Gatineau (CA)

(73) Assignee: Apple Inc., Cupertino, CA (US)

( * ) Notice: Subject to any disclaimer, the term of this patent is extended or adjusted under 35 U.S.C. 154(b) by 889 days.

(21) Appl. No.: 12/343,282

(22) Filed: Dec. 23, 2008

(65) Prior Publication Data

US 2010/0157016 A1    Jun. 24, 2010

(51) Int. Cl.
*H04N 7/14* (2006.01)

(52) U.S. Cl. ............. 348/14.08; 348/14.1; 348/14.12; 348/14.13

(58) Field of Classification Search .... 348/14.01–14.16; 375/240.02
See application file for complete search history.

(56) References Cited

U.S. PATENT DOCUMENTS

| 2008/0068446 A1* | 3/2008 | Barkley et al. ............. 348/14.07 |
| 2010/0008416 A1* | 1/2010 | Ben-Zedeff et al. ..... 375/240.02 |

\* cited by examiner

*Primary Examiner* — Melur Ramakrishnaiah
(74) *Attorney, Agent, or Firm* — Meyertons, Hood, Kivlin, Kowert & Goetzel, P.C.

(57) ABSTRACT

The present invention employs scalable video coding (SVC) in a multi-view camera system, which is particularly suited for video conferencing. Multiple cameras are oriented to capture video content of different image areas and generate corresponding original video streams that provide video content of the image areas. An active one of the image areas may be identified at any time by analyzing the audio content originating from the different image areas and selecting the image area that is associated with the most dominant speech activity.

33 Claims, 9 Drawing Sheets

IMAGE AREA A ACTIVE

IMAGE AREA C ACTIVE

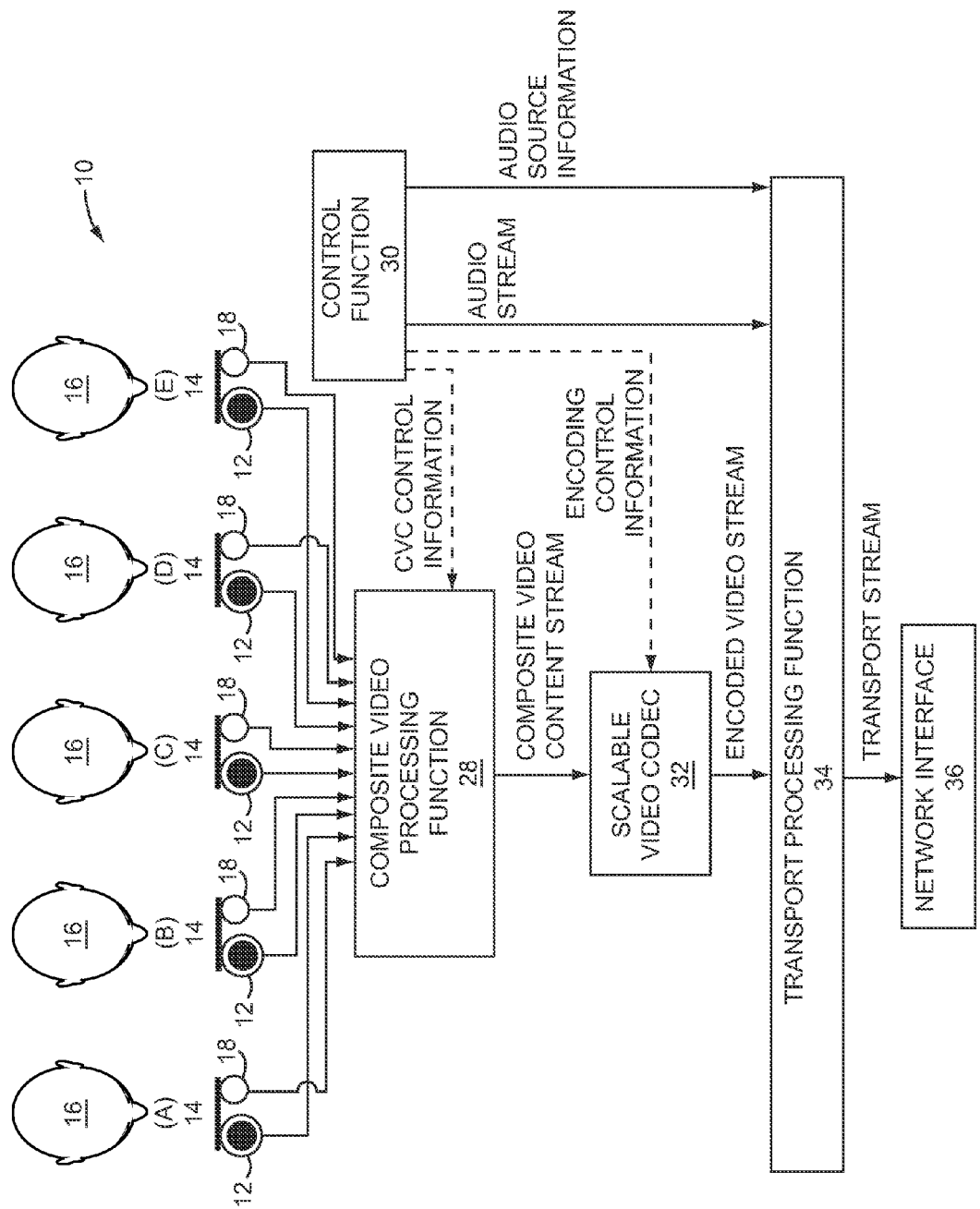

SCALABLE VIDEO ENCODING IN A MULTI-VIEW CAMERA SYSTEM

FIELD OF THE INVENTION

The present invention relates to video conferencing, and in particular to a multi-view camera system that employs scalable video encoding.

BACKGROUND OF THE INVENTION

Video conferencing is gaining traction due to the development of new applications and equipment that make establishing a video conference easy and convenient. However, the quality of the video content in the video conferences is generally low. Part of the quality issue relates to the large amount of bandwidth required to send high quality video between conference locations. Another part of the quality issue relates to the awkward positioning of the video cameras that are used to capture video of the conference locations. Some configurations employ one or two cameras that provide views of most if not all of the conference location. As a result, the resolution of the video is relatively low with respect to any given participant. To increase the resolution of the video for participants, the cameras are moved closer to the active participant and then moved as different participants talk.

Various efforts have been made to address these issues. One noteworthy effort is by Microsoft® and its Round Table conferencing device. The Round Table conferencing device sits in the middle of a conference table and provides a 360 degree view of the conference location and tracks the flow of conversation among the active speakers, such that the audio content of the active speaker is provided to other conference locations along with video content of the 360 degree view of the conference location. As such, close up, high quality video content of the conference participants is available. Unfortunately, the transport of high quality video content from one location to another is very bandwidth intensive. Video conferencing systems, such as the Round Table conference device, generally employ extensive compression, or encoding, techniques to reduce the bandwidth required to transport the video content from one location to another. The extensive encoding generally results in a substantial decrease in quality of the video content in general. Since the video content generally includes images of each of the participants, the quality of the portions of the video allocated to each of the participants, including the active speaker, is also decreased.

When the video content is being viewed at another location by a remote participant, the focus of the remote participant is generally on the active speaker and not on the other non-active participants that are included in the video content. There is a need to provide higher quality video content for the active speaker and little need to provide higher quality video for the other non-active participants. Accordingly, there is a need for a video conferencing technique that is capable of providing higher quality video content for the active speaker while providing lower quality video content for the other non-active participants in a given conference location in a bandwidth efficient and effective manner.

SUMMARY OF THE INVENTION

The present invention employs scalable video coding (SVC) in a multi-view camera system, which is particularly suited for video conferencing. Multiple cameras are oriented to capture video content of different image areas and generate corresponding original video streams that provide video content of the image areas. An active one of the image areas may be identified at any time by analyzing the audio content originating from the different image areas and selecting the image area that is associated with the most dominant speech activity. In a first embodiment, the video content from each of the original video streams is used to generate composite video content, which is carried in a composite video content stream. The composite video content may include multiple image windows, wherein each image window includes the video content of a corresponding image area. The composite video content stream is encoded using SVC to provide an encoded video stream having at least a lower SVC layer and a higher SVC layer. The lower SVC layer includes base information from which the composite video content can be reconstructed at a lower quality level. The higher SVC layer includes enhancement information for a selected portion of the composite video content. The selected portion of the composite video content corresponds to the image window in which video content of the active image area is provided. The enhancement information provides supplemental coding information that, when used with corresponding base information, allows the selected portion of the composite video content to be reconstructed at a higher quality level when the encoded video stream is decoded.

The encoded video stream along with an audio stream for the selected audio content is encapsulated into an appropriate transport stream, such as a Real-Time Transport Protocol (RTP) stream, and delivered to a conference bridge or another conference location. The selected audio content may primarily correspond to that originating from the active image area or a mix of some or all of the different image areas. When the lower SVC layer and the higher SVC layer are used for decoding the encoded video stream at the conference bridge or other conference location, the selected portion of the composite video content is reconstructed at a higher quality level while the rest of the composite video content is reconstructed at the lower quality level. If the higher SVC layer is not available, the entirety of the composite video content may be reconstructed at the lower quality level. Once the composite video content is reconstructed, it may be presented to other conference participants in association with the selected audio content.

In one configuration of the first embodiment, the image windows in the composite video content are allocated to the same image areas for at least a significant portion of a video conference. As the active image area changes from a first image area to a second image area, the selected portion of the composite video content will move from a first image window associated with the first image area to a second image window associated with the second image area. During this change, the enhancement information provided in the higher SVC layer will transition from providing supplemental coding information for the video content of the first image area to providing supplement coding information for the video content of the second image area. In another configuration of the first embodiment, one of the image windows may be fixed as a primary image window, which continuously provides video content of the currently active image area. This primary image window is the selected portion of the composite video content for which enhancement information is provided in the higher SVC layer. The image areas represented in the video content allocated to the primary image window will change as the active image area changes. For example, as the active image area changes from a first image area to a second image area, the video content provided in the primary image window will change from that of the first image area to that of the second image area. During this change, the primary image window remains in the same location; however, the source of the video content that is provided in the primary image window will change. As such, the enhancement information provided in the higher SVC layer will continue to provide supplemental coding information for the video content that is currently allocated to the primary window, although the source of the video content has changed.

In another embodiment, the multiple cameras are again oriented to capture video content of different image areas and generate corresponding original video streams that provide video content of the image areas. An active one of the image areas may be identified at any time by analyzing the audio content originating from the different image areas and selecting the image area that is associated with the most dominant speech activity. Instead of generating composite video content from video content for each of the original streams as provided in the first embodiment, each of the original video streams are individually encoded using SVC to provide corresponding encoded video streams. Notably, the original video stream that contains video content of the active image area is encoded at a higher quality (HQ) level using SVC to provide an HQ encoded video stream, while the original video streams that contain video content of the other non-active image areas are encoded at a lower quality (LQ) level to provide LQ encoded video streams.

The HQ encoded video stream will include at least a lower SVC layer and a higher SVC layer. The lower SVC layer includes base information from which the video content of the active image area can be reconstructed at a lower quality level. The higher SVC layer includes enhancement information for the video content of the active image area. The enhancement information provides supplemental coding information that, when used with corresponding base information, allows the selected video content of the active image area to be reconstructed at the higher quality level when the HQ encoded video stream is decoded. Preferably, the LQ encoded streams will include the lower SVC layer, but not the higher SVC layer to conserve bandwidth.

Each of the encoded video streams along with the audio stream for the selected audio content are encapsulated into an appropriate transport stream, such as an RTP stream, and delivered to a conference bridge or another conference location. Accordingly, the transport stream will contain multiple encoded video streams, which correspond to the different image areas, including the active image area. The selected audio content may primarily correspond to that originating from the active image area or a mix of some or all of the different image areas.

When the lower SVC layer and the higher SVC layer are used for decoding the HQ encoded video stream at the conference bridge or other conference location, the video content of the active image area is reconstructed at the higher quality level. Since the higher SVC layer is not provided in the LQ encoded video streams, the video content of the other non-active image areas is reconstructed at the lower quality level using the lower SVC layer. Once the video content of the different image areas are reconstructed, they may be presented to other conference participants in association with the selected audio content.

In either of the embodiments, audio source information bears on the source of the selected audio content and may be provided in association with audio content in the transport stream. In one embodiment, the audio source information may identify the source, image area, or encoded video stream with which the selected audio content is associated. In another embodiment, the audio source information may include information that will be used for controlling how the selected audio content is presented in association with reconstructed video content upon being decoded at another conference location. The audio source information may control the playback of the selected audio content such that the selected audio content is perceived to originate from a general or particular location on a display from which video content that is associated with selected audio content is being presented. As such the audio source information may relate to a head-related transfer function or mixing instructions, which control how the audio content is mixed into audio signals that are sent to two or more speakers being used for playback of the selected audio content.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 4 is a block representation of a multi-view camera system according to one embodiment of the present invention.

DETAILED DESCRIPTION OF THE PREFERRED EMBODIMENTS

Figure 1:
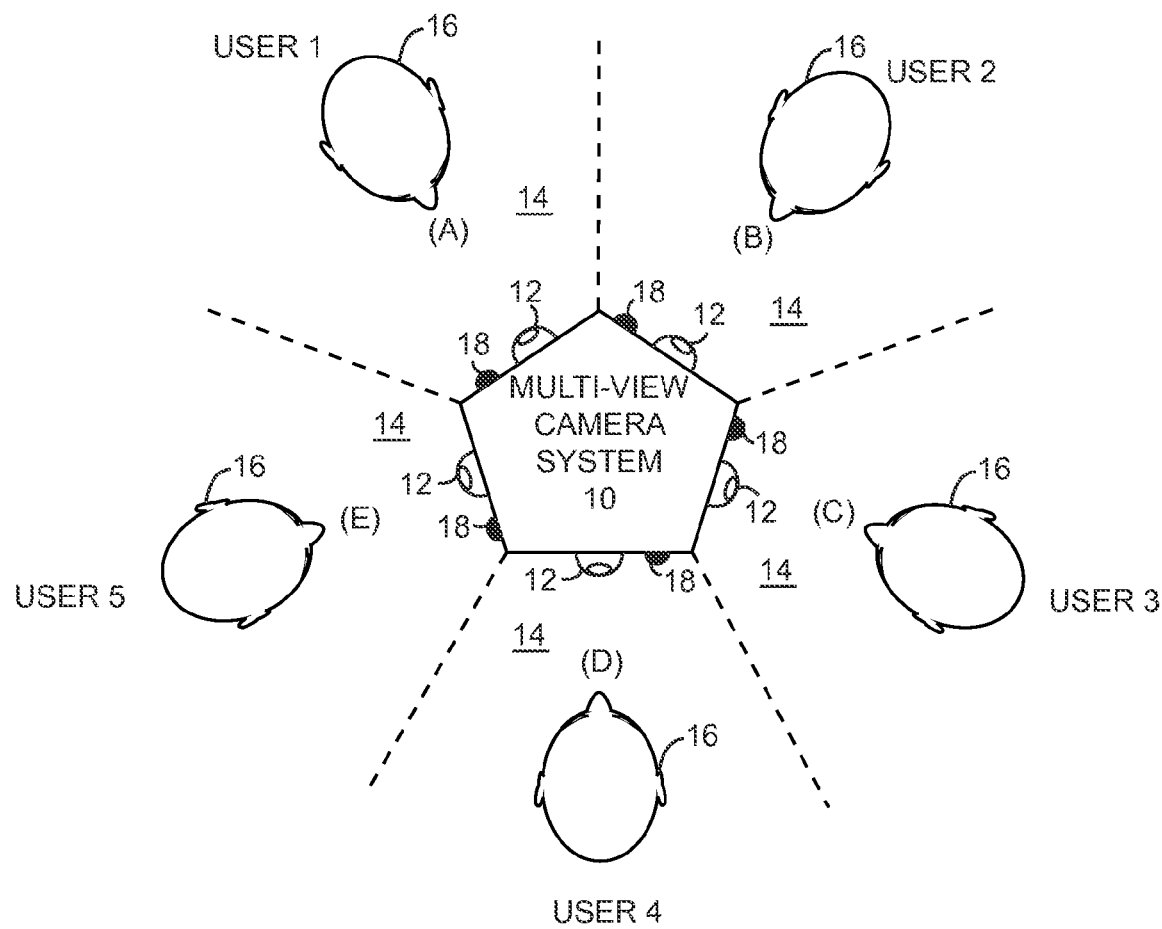
FIG. 1 is a block representation of a multi-view camera system in a conference location according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Prior to delving into the details of the present invention, an overview of scalable video encoding (SVC) is provided. Scalable video encoding is defined as an encoding process in which source content in the form of a video stream is encoded only once to provide a scalable bit stream that provides multiple encoding layers, wherein each encoding layer is associated with a different coding efficiency. Coding efficiency generally corresponds to the bit rate necessary to present a defined level of perceived quality once information is decoded. A scalable bit stream will include a base layer and one or more hierarchical enhancement layers. The base layer is associated with the highest available coding efficiency, and thus, the lowest perceived quality for a given encoding scheme. The information of the base layer represents an independent sub-bit stream, which can be decoded independently without having access to information of the enhancement layers. If only the information from the base layer is available, the information of the base layer can be independently decoded to recover the source content at the lowest perceived quality level.

If information from the next, or first, enhancement layer of the hierarchical enhancement layers is available in addition to the information of the base layer, the enhancement information of the first enhancement layer may be used to supplement the information of the base layer during decoding to recover the source content at a higher perceived quality than what was available with only the information from the base layer. The information of the first enhancement layer cannot be decoded without the information of the base layer. If information from a second enhancement layer of the hierarchical enhancement layers is available in addition to the information of the base layer and the first enhancement layer, the information of the second enhancement layer may be used to supplement the information of the base layer and first layer during decoding to recover the source content at yet an even higher perceived quality than what was available with only the information from the base layer and the first enhancement layer. The information of the second enhancement layer cannot be decoded without the information of the base layer and the first enhancement layer. Any number of enhancement layers may be provided in the scalable bit stream. However, to decode at a hierarchical level associated with a given enhancement layer, information from the base layer, the given enhancement layer, as well as any intervening enhancement layers is needed.

Each layer of a scalable bit stream is allocated to defined portions of the bit stream. The base layer will be associated with first portions of the bit stream, and each of the enhancement layers will be associated with different portions of the bit stream. Notably, only those portions of the bit stream that will be used for decoding need to be transported to the decoder that provides the decoding. Portions that will not be used for decoding can, but need not be, transported to the decoder. As such, if only a low quality version of the source content is needed or there is limited bandwidth to transport a bit stream representing the source content, then only those portions of the scalable bit stream that are associated with the base layer need to be transported to the decoder in a single sub-bit stream. If a higher quality version of the source content is desired and there is sufficient bandwidth, those portions of the scalable bit stream that are associated with the base layer and the necessary enhancement layers are transported to the decoder in a single sub-bit stream. Accordingly, a scalable bit stream is considered scalable when portions, or layers, of the scalable bit stream can be removed to effectively form a sub-bit stream, which can be decoded without having access to those portions that have been removed from the scalable bit stream. A sub-bit stream may remain a scalable bit stream or may represent a fixed bit stream. When scalable, the sub-bit stream has portions associated with the base layer in addition to at least one enhancement layer. When fixed, a sub-bit stream will only include the base layer.

An exemplary scalable video coding (SVC) standard is referred to as H.264 SVC, which is an extension to the H.264/MPEG-4 AVC (Advanced Video Coding) video compression standard that was jointly developed by the ITU-T Video Coding Experts Group (VCEG) together with the International Standards for Organization (ISO) International Electrotechnical Commission (IEC) Moving Picture Experts Group (MPEG). The SVC extension to the H.264/MPEG-4 AVC standard as well as the H.264/MPEG-4 AVC standard are incorporated herein by reference in their entireties. Notably, scalable video coding may technically relate to temporal, spatial, or quality scalability, or any combination thereof. For the purposes herein, any type of scalability alone or combination is considered as affecting perceived quality, and as such the use of the terms or phrases relating to quality or perceived quality shall be considered generic to any type or combination of scalability.

With reference to FIG. 1, the present invention employs scalable video coding (SVC) in a multi-view camera system 10, which is particularly suited for video conferencing. Multiple cameras 12 are oriented to capture video content of different image areas 14 and generate corresponding original video streams that provide video content of the image areas 14. The image areas 14 may each include any number of conference participants 16 or objects, and as illustrated, each image area 14 includes one participant 16. In a preferred embodiment, the speech activity of the various participants 16 represents the audio content from the corresponding image areas 14. The participant 16 who is the dominant speaker at any given time is generally considered the active speaker, and the image area 14 in which the active speaker resides or is associated with may be selected as the active image area 14. One or more microphones 18 are provided to capture the audio content that is generated in the conference environment, and preferably from the different image areas 14. The active one of the image areas 14 may be identified at any time by analyzing the audio content from the different image areas 14 and selecting the image area 14 that is associated with the dominant audio content as an active image area 14. The active one of the image areas 14 will change as the active speaker changes during the conference session. Notably, the specific examples provided herein relate to selecting a single active image area 14 at any given time; however, the disclosed concepts of the present invention include selecting multiple active image areas 14 at any given time, perhaps constructing a selected image out of portions of adjacent image areas 14 and processing the corresponding video content accordingly.

As illustrated, each image area 14 includes an individual letter designation, A through E, which is used when a particular image area 14 is referenced in the following description. These letter designations may also be used herein when a particular camera 12, microphone 18, or other element is specifically referenced. Similarly, each participant 16 is particularly designated as one of User 1 through User 5. As such, image areas 14(A) through 14(E) correspond to cameras 12(A) through 12(E), microphones 18(A) through 18(E), and Users 1 through 5, respectively. As depicted, there are five (5) cameras 12, which are spaced apart and oriented outward about a perimeter of the multi-view camera system 10 to provide substantially 360 degree coverage of the conference environment. The multi-view camera system 10 may include any number of cameras 12. Further, although depicted and described as being located in the middle of the conference environment and aligned to capture images of the conference participants 16 who essentially encircle the multi-view camera system 10, the cameras 12 may be linearly or otherwise oriented as desired within the conference environment.

As noted, multiple cameras 12 are oriented to capture video content of different image areas 14 and generate corresponding original video streams that provide video content of the image areas 14. In a first embodiment, the video content from each of the original video streams is combined to generate composite video content 20, such as that represented in FIG. 2A. The composite video content 20 may include multiple image windows 22, wherein the video content of the respective image areas 14 is mapped to a desired image window 22 to form the composite video content 20. The composite video content 20 is carried in a composite video content stream, which is encoded using SVC to provide an encoded video stream having at least a lower SVC layer and a higher SVC layer. The lower SVC layer includes base information from which the composite video content 20 can be reconstructed at a lower quality level. Notably, the base information of the lower SVC layer may be derived from a base SVC layer or from a base SVC layer and one or more lower level enhancement layers.

The higher SVC layer includes enhancement information for a selected portion 24 of the composite video content 20. The selected portion 24 of the composite video content 20 may correspond to the image window 22 in which video content of the active image area 14 is provided. The enhancement information provides supplemental coding information that, when used with corresponding base information, allows the selected portion 24 of the composite video content 20 to be reconstructed at a higher quality level when the encoded video stream is decoded. As such, the lower SVC layer may always provide sufficient information to enable a lower quality reconstruction of the composite video content 20 upon decoding the encoded video stream. When available, the enhancement information of the higher SVC layer enables a higher quality reconstruction of the selected portion 24 of the composite video content 20 while the remaining portions of the composite video content 20 are reconstructed at the lower quality level. In addition to being reconstructed at a higher quality level, the selected portion 24 or corresponding image window 22 that contains the video content of the active image area 14 may be highlighted.

Figure 2A:
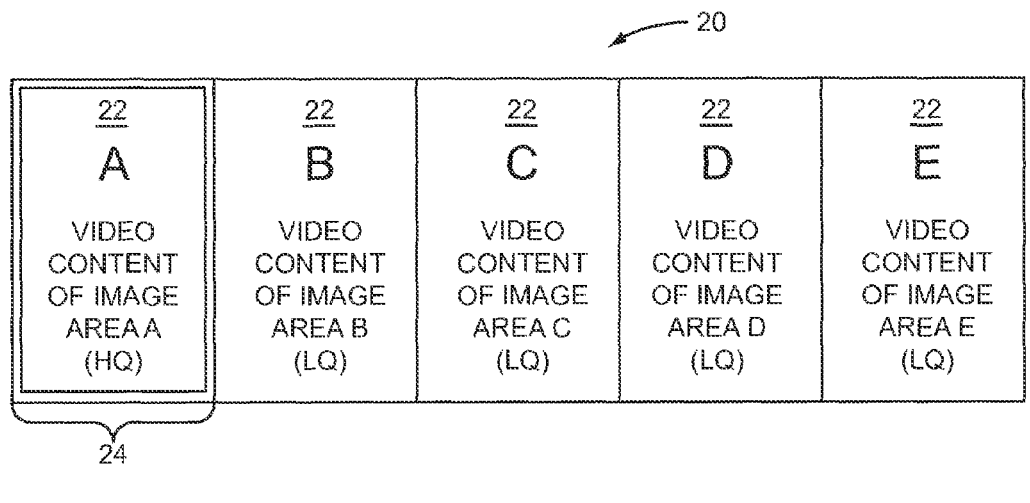
FIGS. 2A and 2B illustrate composite video content according to a first embodiment of the present invention.

As illustrated in FIG. 2A, assume that User 1 is the active speaker, and as such, the active one of the image areas 14 is image area 14(A) and image window 22(A) is the selected portion of the composite video content 20. Further assume that the video content of image areas 14(A) through 14(E) is allocated to the image windows 22, respectively. Since image area 14(A) is active, the composite video content stream is encoded such that the lower SVC layer includes base information from which the composite video content 20, including the video content in each of the image windows 22, can be reconstructed at a lower quality level. The higher SVC layer includes enhancement information for the selected portion 24 of the composite video content 20. The selected portion 24 corresponds to the image window 22(A), which includes the video content for active image area 14(A). As such, the enhancement information provides supplemental coding information that, when used with corresponding base information, allows the video content of the active image area 14(A) that is mapped to the selected portion 24 of the composite video content 20 to be reconstructed at a higher quality level when the encoded video stream is decoded. In FIG. 2A, image windows 22(B) through 22(E) are designated with an "LQ" to indicate that these portions of the composite video content 20 will not have supplemental coding information provided in the higher SVC layer, and as such may only be decoded at the lower SVC layer or below to provide a lower quality reconstruction. Image window 22(A), which is associated with the selected portion 24, may be reconstructed at the higher quality level when the supplemental coding information is available to enhance the corresponding base information.

The image windows 22 in the composite video content 20 may be allocated to the same image areas 14 for at least a significant portion of a video conference. As the active image area 14 changes from a first image area 14 to a second image area 14 in response to the active speaker changing, the selected portion 24 of the composite video content 20 will move from a first image window 22 associated with the first image area 14 to a second image window 22 associated with the second image area 14. During this change, the enhancement information provided in the higher SVC layer will transition from providing supplemental coding information for the video content of the first image area 14 to providing supplemental coding information for the video content of the second image area 14.

Figure 2B:
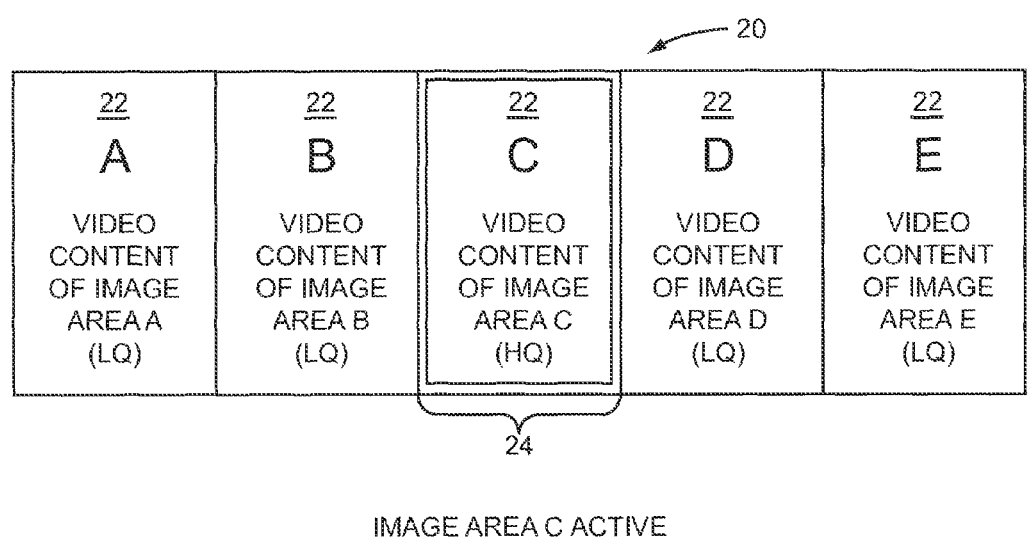

Continuing with the example, assume that User 3 in image area 14(C) becomes the active speaker and User 1 is no longer the active speaker. As illustrated in FIG. 2B, image area 14(C) will become an active image area 14, and image area 14(A) will no longer be an active image area 14. Image window 22(C) will become the selected portion 24 of the composite video content 20. The composite video content stream continues to be encoded using SVC such that the lower SVC layer includes base information from which the composite video content 20, including the video content in each of the image windows 22, can be reconstructed at a lower quality level. The higher SVC layer still includes enhancement information for the selected portion 24 of the composite video content 20; however, the selected portion 24 has moved to another portion of the composite video content 20. Since the selected portion 24 now corresponds to the image window 22(C), the enhancement information in the higher SVC layer provides supplemental coding information that, when used with corresponding base information, allows the video content of the active image area 14(C) that is mapped to the new selected portion 24 of the composite video content 20 to be reconstructed at a higher quality level when the encoded video stream is decoded.

In FIG. 2B, image windows 22(A), 22(B), 22(D), and 22(E) are designated with an "LQ" to indicate that these portions of the composite video content 20 will not have supplemental coding information provided in the higher SVC layer, and as such may only be decoded at the lower SVC layer or below to provide a lower quality reconstruction. Image window 22(C), which is associated with the new selected portion 24, may be reconstructed at the higher quality level when the supplemental coding information is available to enhance the corresponding base information.

Figure 3A:
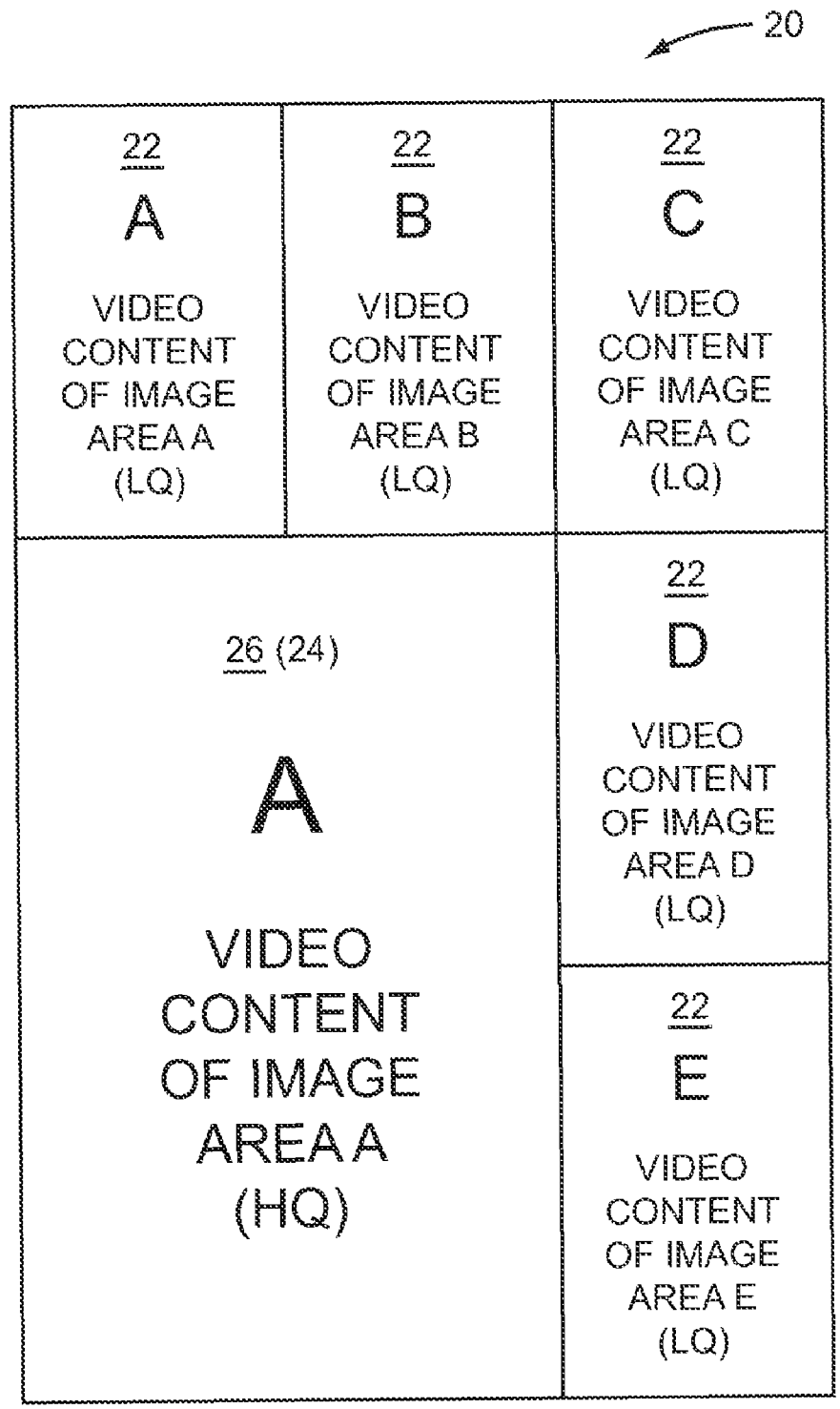
FIGS. 3A and 3B illustrate composite video content according to a second embodiment of the present invention.
Figure 3B:
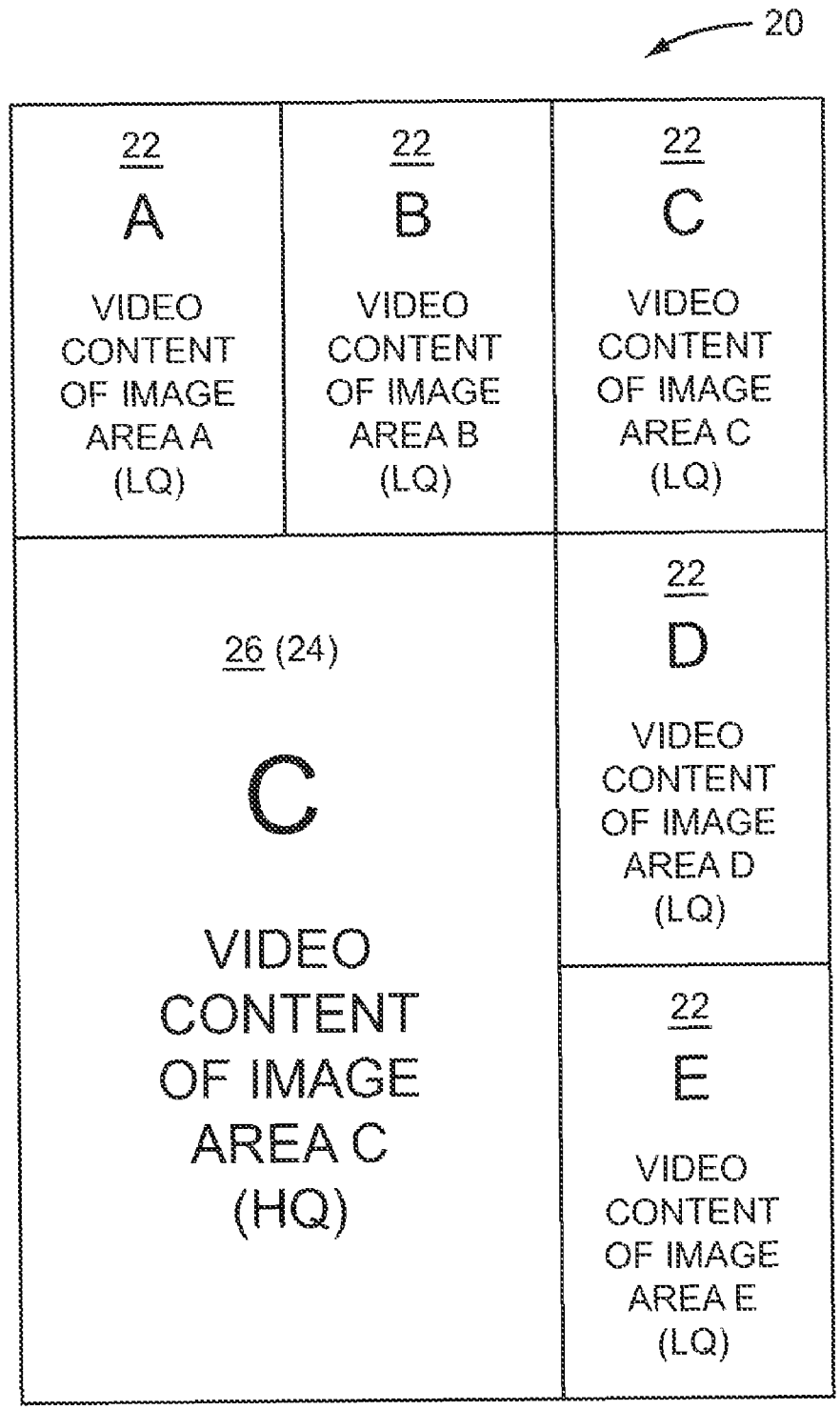

Another configuration of the composite video content 20 is provided in FIGS. 3A and 3B. As illustrated, a primary window 26 may be provided in addition to the regular image windows 22. The primary window 26 always provides video content of the currently active image area 14. The primary image window 26 represents the selected portion 24 of the composite video content 20 and may remain fixed relative to the other image windows 22. However, video content of the image areas 14 that are mapped to the primary window 26 will change as the active image area 14 changes. As the active image area 14 changes from a first image area 14 to a second image area 14, the video content provided in the primary window 26 will change from that of the first image area 14 to that of the second image area 14. During this change, the relative location of the primary window 26 remains unchanged; however, the source of the video content that is provided in the primary window 26 of the composite video content 20 will change. As such, the lower SVC layer may always provide sufficient information to enable a lower quality reconstruction of the composite video image 20 upon decoding the encoded video stream. When available, the enhancement information of the higher SVC layer enables a higher quality reconstruction of the selected portion 24 (or primary window 26) of the composite video image 20, while the remaining portions of the composite video content 20 are reconstructed at the lower quality level.

As illustrated, the remaining portions of the composite video content 20 include the image windows 22, each of which is illustrated as being allocated to video content of each of the image windows 22(A) through 22(E). In this example, the composite video content 20 may include video content of the active image area 14 in a corresponding image window 22 as well as the primary window 26. When decoded using the lower and higher SVC layers, the video content of the active image area 14 in the primary window 26 is reconstructed at the higher quality level and the video content of the active image area 14 in the corresponding image window 22 is reconstructed at the lower quality level. The video content in the other image windows 22 are also reconstructed at the lower quality level. FIG. 3A illustrates a time when User 1 is the active speaker and image area 14(A) is selected as the active image area 14. The video content of the active image area 14(A) is mapped to the primary window 26 of the composite video content 20, and the higher SVC layer will include enhancement information for the video content of active image area 14(A). When User 3 becomes the active speaker, the active image area 14 will change from image area 14(A) to image area 14(C), as illustrated in FIG. 3B. As such, the video content of active image area 14(C) is mapped to the primary window 26 of the composite video content 20, and the higher SVC layer will switch to providing enhancement information for the video content of active image area 14(C).

The encoded video stream for the composite video content 20 along with an audio stream for the selected audio content is encapsulated into an appropriate transport stream, such as a Real-Time Transport Protocol (RTP) stream, and delivered to a conference bridge or another conference location. The selected audio content may solely or primarily correspond to that originating from the active image area 14 or may be a mix of any one or more the different image areas 14. Preferably, the audio content from the currently active image area 14 is provided in the transport stream with the encoded video stream. When the lower SVC layer and the higher SVC layer are used for decoding the encoded video stream at the conference bridge or other conference location, the selected portion 24 of the composite video content 20 is reconstructed at a higher quality level, while the rest of the composite video content 20 is reconstructed at the lower quality level. If the higher SVC layer is not available, the entirety of the composite video content 20 may be reconstructed at the lower quality level. Once the composite video content 20 is reconstructed, it may be presented to other conference participants in association with the selected audio content.

With reference to FIG. 4, a block representation of a multi-view camera system 10 is illustrated. The cameras 12 capture video content of different image areas 14 and generate corresponding original video streams that provide video content of the image areas 14. The original video streams are delivered to a composite video processing function 28, which will generate the composite video content 20 in a predetermined manner or based on composite video content (CVC) control information, which is provided by a control function 30. The CVC control information provided by the control function 30 may be used to control the shape, size, or layout of the composite video content 20. For example, the panoramic layout of the composite content window, as illustrated in FIGS. 2A and 2B, and the corresponding allocation of video content from the various image areas 14 to image windows 22 may be statically or dynamically controlled based on the CVC control information.

The active one of the image areas 14 may be identified by the control function 30 at any time by analyzing the audio content from the different microphones 18 and selecting the image area 14 that is associated with the dominant audio content as an active image area 14. The control function 30 may use the CVC control information to identify the active image area 14 to the composite video processing function 28. When the source of the video content allocated to a primary window 26 changes based on the active image area 14, such as provided in FIGS. 3A and 3B, the active image area 14 may be used to identify the currently active image area 14. The composite video processing function 28 can then dynamically map the video content of the currently active image area 14 to the primary window 26.

The composite video content 20 is provided in a composite video content stream, which is passed to a scalable video codec (coder/decoder) 32, which will encode the composite video stream as described above using SVC to provide an encoded video stream. The encoded video stream will have at least the lower SVC layer and the higher SVC layer, wherein the lower SVC layer includes base information from which the composite video content 20 can be reconstructed at a lower quality level. The higher SVC layer includes supplemental coding information for the selected portion 24 of the composite video content 20.

The control function 30 may also provide encoding control information to the scalable video codec 32. The encoding control information may identify the select portion 24 of the composite video content 20 that should be encoded at the higher quality level. In other words, the encoding control information may identify the select portion 24 of the composite video content 20 for which supplemental coding information should be provided in the higher SVC layer. This is particularly beneficial when the select portion 24 of the composite video content 20 is dynamically changing during the conference session, such as illustrated in FIGS. 2A and 2B. The encoding control information may also select the actual SVC encoding levels to use in the lower and higher SVC layers. If the select portion 24 is fixed within the composite video content 20, such as illustrated in the primary window 26 of FIGS. 3A and 3B, the encoding control information may not be necessary for identifying the select portion 24 to be encoded at the higher quality level. In an alternative embodiment, encoding control information may be provided to the scalable video codec 32 by the composite video processing function 28.

The control function 30 may generate audio source information, which bears on the source of the selected audio content and may be provided in association with audio content in the transport stream. The audio source information may identify the source, image area 14, or encoded video stream with which the selected audio content is associated. Alternatively, the audio source information may include information that will be used in controlling how the selected audio content is presented in association with reconstructed video content upon being decoded at another conference location. The audio source information may control the playback of the selected audio content such that the selected audio content is perceived to originate from a general or particular location on a display. The location may correspond to the location from which video content that is associated with selected audio content is being presented. As such, the audio source information may provide source direction information to a head-related transfer function or mixing instructions, which control how the audio content is mixed into audio signals that are sent to two or more speakers or headphones being used for playback of the selected audio content.

The control function 30 may generate or select the selected audio content and provide a corresponding audio stream, along with any associated audio source information to a transport processing function 34. The encoded video stream is also passed to the transport processing function 34 by the scalable video codec 32. The encoded video stream along with an audio stream for the selected audio content and any audio source information is encapsulated into an appropriate transport stream and delivered to a conference bridge or another conference location via a network interface 36.

Figure 5:
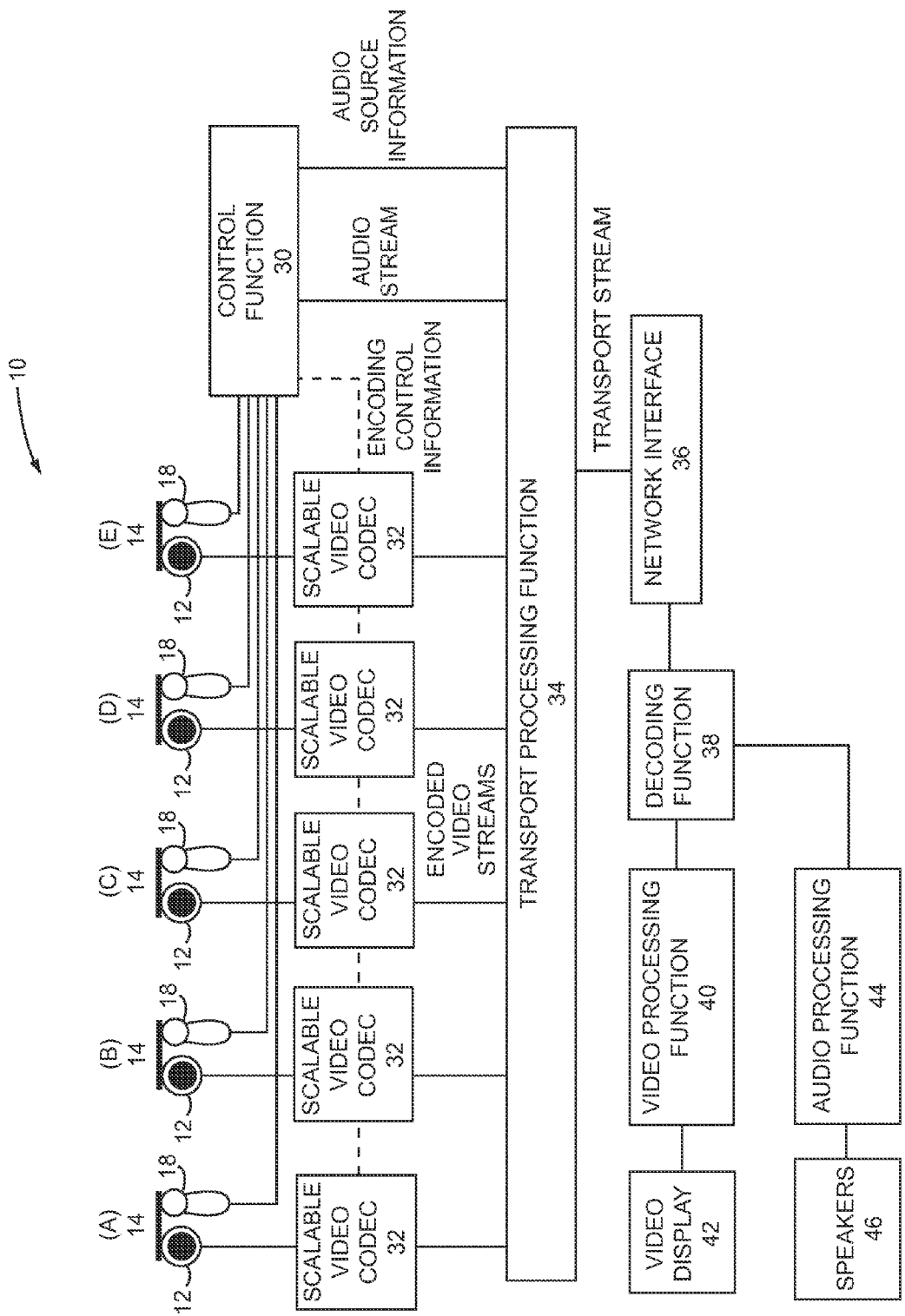
FIG. 5 is a block representation of a multi-view camera system according to another embodiment of the present invention.

In another embodiment, the multiple cameras 12 are again oriented to capture video content of different image areas 14 and generate corresponding original video streams that provide video content of the image areas 14. As illustrated in FIG. 5, an active one of the image areas 14 may be identified at any time by analyzing the audio content originating from the different microphones 18 and selecting the image area 14 that is associated with the most dominant speech activity. Instead of generating composite video content 20 from video content for each of the original streams as provided in the first embodiment, each of the original video streams are sent to corresponding scalable video codecs 32. Each scalable video codec 32 encodes a corresponding original video stream using SVC to provide corresponding encoded video streams. Notably, the original video stream that contains video content of the active image area 14 is encoded at a higher quality level using SVC to provide an HQ encoded video stream, while the original video streams that contain video content of the other, non-active, image areas 14 are encoded at a lower quality level to provide LQ encoded video streams.

The active one of the image areas 14 may be identified by the control function 30 at any time by analyzing the audio content from the different microphones 18 and selecting the image area 14 that is associated with the dominant audio content as an active image area 14. Based on the active image area 14, the control function 30 instructs the scalable video codec 32 that is encoding the video content of the active image area 14 to encode the video content at the higher quality level to provide the HQ encoded video stream. Concurrently, the control function 30 instructs the scalable video codecs 32 that are encoding the video content of the other, or non-active, image areas 14 to encode the respective video content at one or more lower quality levels to provide the LQ encoded video streams.

The HQ encoded video stream will include at least a lower SVC layer and a higher SVC layer. The lower SVC layer includes base information from which the video content of the active image area 14 can be reconstructed at a lower quality level. The higher SVC layer includes enhancement information for the video content of the active image area 14. The enhancement information provides supplemental coding information that, when used with corresponding base information, allows the selected video content of the active image area 14 to be reconstructed at the higher quality level when the HQ encoded video stream is decoded. Preferably, the LQ encoded streams will include the lower SVC layer, but not the higher SVC layer to conserve bandwidth.

Each of the encoded video streams along with the audio stream for the selected audio content and any audio source information are encapsulated into an appropriate transport stream by the transport processing function 34 and delivered to a conference bridge or another conference location via a network interface 36. Accordingly, the transport stream will contain multiple encoded video streams, which correspond to the different image areas 14, including the active image area 14. The selected audio content may primarily correspond to that originating from the active image area 14, or may be a mix of some or all of the different image areas 14, and if available, may be associated with appropriate audio source information.

When the lower SVC layer and the higher SVC layer are used for decoding the HQ encoded video stream at the conference bridge or other conference location, the video content of the active image area 14 is reconstructed at the higher quality level. Since the higher SVC layer is not provided in the LQ encoded video streams, the video content of the other, non-active, image areas 14 is reconstructed at the lower quality level using the lower SVC layer. Once the video content of the different image areas 14 are reconstructed, they may be presented to other conference participants in a desired format and in association with the selected audio content. The format is controlled by the device presenting the video content, as the video content of the different image areas is independent and may be placed, sized, or otherwise manipulated on an associated display in virtually any manner.

Continuing with FIG. 5, the multi-view camera system 10 may also be able to receive incoming audio and video streams and present the associated content to the participants 16 in a variety of ways. If encapsulated in a transport stream, the incoming audio and video streams may be received by the network interface 36 and passed to a decoding function 38, which may provide any necessary decoding of the respective audio and video streams. The resulting video content is provided to a video processing function 40, which will process the video content and provide the processed video content to a video display 42. The resulting audio content is provided to an audio processing function 44, which will process the audio content and provide the processed audio content to one or more speakers 46. The video content may be provided in a single stream and represent composite content of multiple conference areas, or content of a single conference area. Alternatively, the video content may be provided in multiple video streams, wherein the video content from each stream is processed and mapped to a corresponding viewing window for display on the video display 42.

If the audio content is associated with audio source information, the audio processing function 44 may use the audio source information to control how the audio content is processed and mapped into audio signals that drive the respective speakers 46. Based on the audio source information, the audio content may be presented via the speakers 46 such that the audio content is perceived to originate from a general or particular location on a display corresponding to a location from which particular video content that is associated with audio content is being presented.

Figure 6:
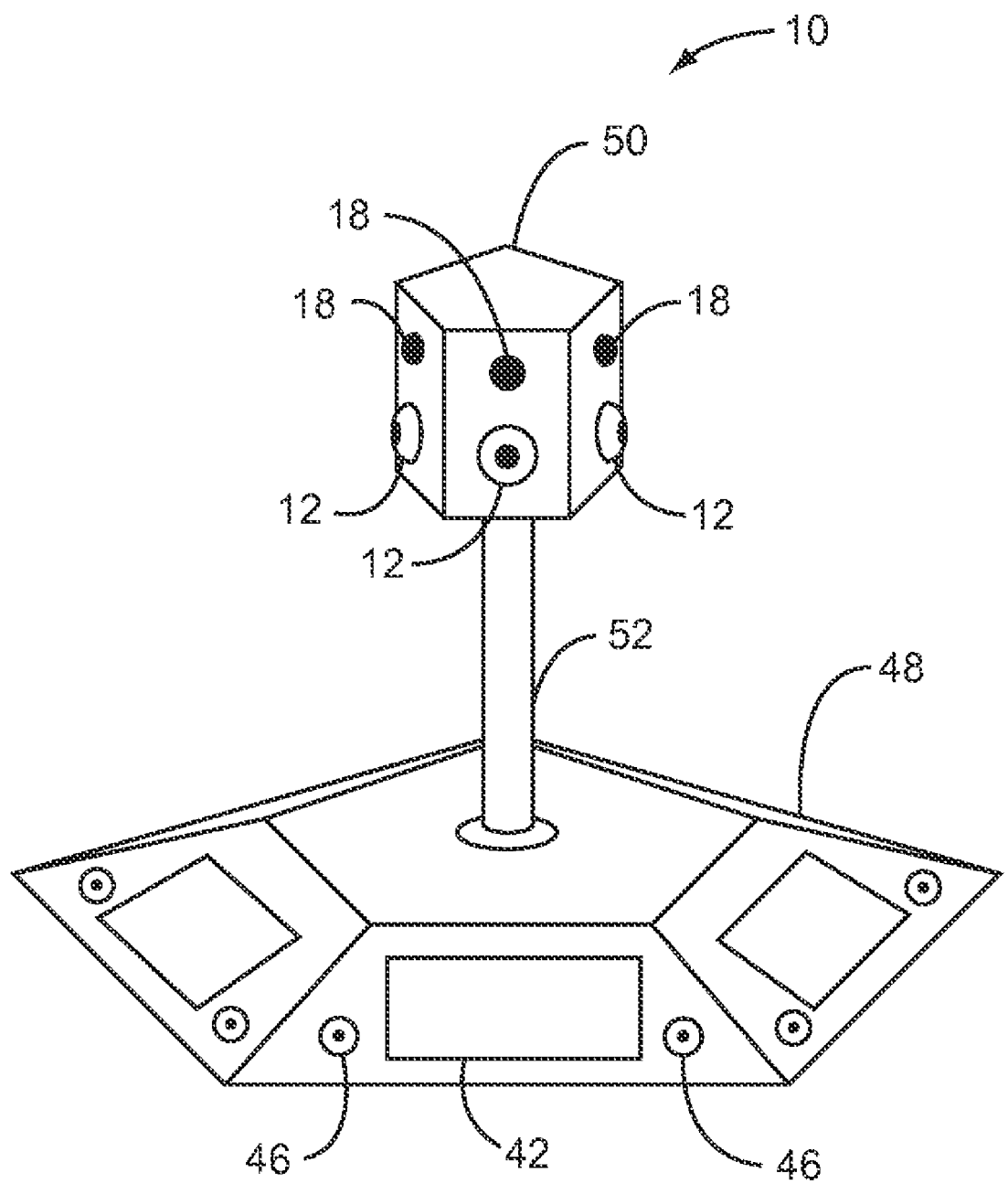
FIG. 6 illustrates an exemplary multi-view conference system constructed according to one embodiment of the present invention.

A block representation of an exemplary the multi-view camera system 10 is illustrated in FIG. 6, according to one embodiment of the present invention. Those skilled in the art will recognize that different configurations are available. Further, there is no requirement that speakers 46, video displays 42, or the circuitry associated therewith be integrated with or provided in association with cameras 12, microphones 18, and the circuitry associated therewith. As depicted, the multi-view camera system 10 includes a base unit 48 in which the video displays 42 and speakers 46 are mounted. The cameras 12 and microphones 18 may be mounted on a head unit 50, which is affixed to the base unit 48 via a support structure 52.

The electronics that provide the functionality required for operation may be located in the base unit 48, the head unit 50, the support structure 52, or distributed therebetween. Although five sides are illustrated, any number of sides may be employed as is practical.

Figure 7:
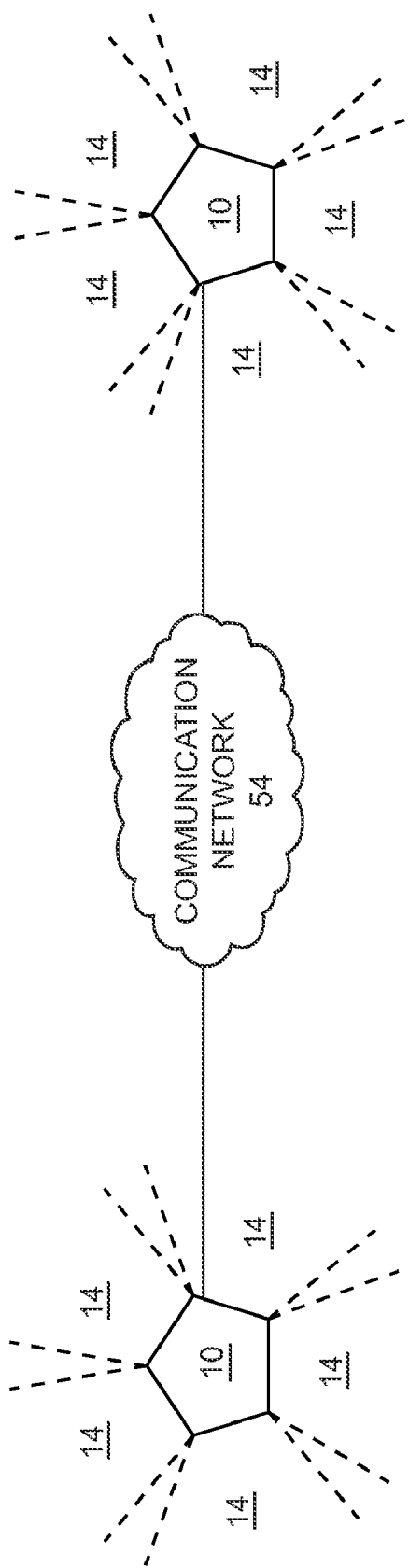
FIG. 7 illustrates a conference communication environment in which two multi-view camera systems communicate with each other via a communication network according to one embodiment of the present invention.
Figure 8:
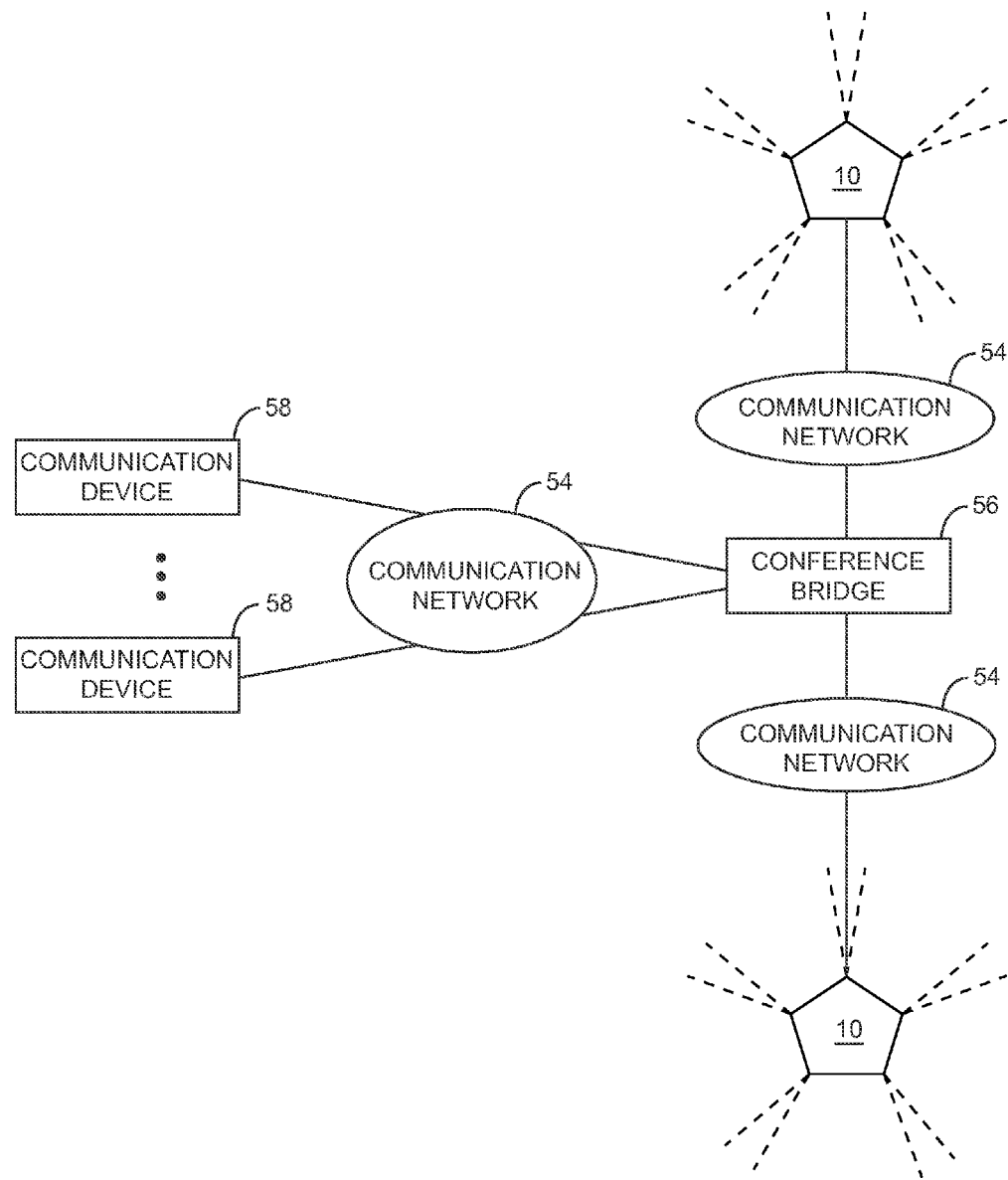
FIG. 8 illustrates a conference environment employing a multi-view camera system according to one embodiment of the present invention.

With reference to FIG. 7, two multi-view camera systems 10 may be communicatively coupled via an appropriate communication network 54 to support conferencing. Each multi-view camera system 10 may operate as described above to provide audio and video content of its respective image areas 14 to the other to facilitate video conferences. Notably, a multi-view camera system 10 may also be communicatively coupled to another conference or communication device that is not a multi-view camera system 10 directly or via a conference bridge 56, as illustrated in FIG. 8. The conference bridge 56 may support audio and video conferences and allow any number of multi-view camera systems 10 and other communication devices 58 to participate in a video conference that has an audio component. The conference bridge 56 may facilitate the sharing of the video content from each of the conference locations to the other conference locations. For the audio content, the conference bridge 56 may analyze the audio content from the respective locations, dynamically select the audio content from a given conference location, and pass the selected audio content to either each of the other conference locations or all of the conference locations. The selected audio content is preferably the dominant audio content, such as that associated with the conference location that currently has the active speaker or speakers. As such, each conference location may receive video content from the other conference location all of the time, and only receive audio content from the conference location that has the active speaker in traditional fashion.

The various functions that are described above represent and may be implemented in appropriate electronics. The control, audio, video, encoding, and decoding functions may be provided in the same or separate circuitry, application specific integrated circuits, and the like. As such, the functions described herein are considered to include the appropriate circuitry required to implement the function alone or in conjunction with other functions.

Those skilled in the art will recognize improvements and modifications to the preferred embodiments of the present invention. All such improvements and modifications are considered within the scope of the concepts disclosed herein and the claims that follow.

What is claimed is:

1. A method comprising:
    capturing video content of a plurality of image areas in a conference location from a plurality of cameras and providing a plurality of original video streams, wherein each of the original video streams corresponds to video content of a corresponding one of the plurality of image areas;
    identifying at least one active image area of the plurality of image areas;
    encoding at a higher quality level at least one of the plurality of original video streams that corresponds to the at least one active image area using scalable video coding (SVC) to provide at least one higher quality encoded video stream;
    encoding at a lower quality level at least one other of the plurality of video streams that corresponds to at least one other image area using SVC to provide at least one lower quality encoded video stream; and
    effecting delivery of the at least one higher quality encoded video stream and the at least one lower quality encoded video stream to a device outside of the conference location.

2. The method of claim 1 wherein the at least one higher quality encoded video stream comprises:
    a lower SVC layer comprising information from which the video content of the at least one active image area can be reconstructed at the lower quality level; and
    a higher SVC layer comprising supplemental coding information that, when used with the information of the lower SVC layer, allows the video content of the at least one active image area to be reconstructed at the higher quality level.

3. The method of claim 2 wherein the at least one lower quality encoded video stream does not include the supplemental coding information that would allow the video content of the at least one other of the plurality of original video streams to be reconstructed at the higher quality level.

4. The method of claim 2 wherein the at least one lower quality encoded video stream does not include the higher SVC layer.

5. The method of claim 4 wherein the at least one lower quality encoded video stream comprises the lower SVC layer comprising information from which the video content of the at least one other image area can be reconstructed at the lower quality level.

6. The method of claim 2 wherein the lower SVC layer consists of a base SVC layer that represents an independent sub-bit stream from which the video content of the at least one active image area can be reconstructed at the lower quality level.

7. The method of claim 2 wherein the lower SVC layer comprises a base SVC layer that represents an independent sub-bit stream from which the video content of the at least one active image area can be reconstructed and an enhancement layer that, when used with the base SVC layer, allows the video content of the at least one active image area to be reconstructed at the lower quality level.

8. The method of claim 1 wherein identifying the at least one active image area of the plurality of image areas comprises:
    capturing audio content from the conference location; and
    analyzing the audio content to select the at least one active image area.

9. The method of claim 8 wherein analyzing the audio content to select the at least one active image area comprises:
    monitoring speech activity that is originating from the plurality of image areas; and
    selecting as the at least one active image area at least one of the plurality of image areas from which dominant speech activity is being received.

10. The method of claim 1 further comprising effecting delivery of at least select audio content to the device outside of the conference location with the at least one higher quality encoded video stream and the at least one lower quality encoded video stream.

11. The method of claim 10 wherein the effecting delivery of the at least one higher quality encoded video stream and the at least one lower quality encoded video stream to the device outside of the conference location comprises:
    encapsulating the at least one higher quality encoded video stream, the at least one lower quality encoded video stream, and the at least select audio content in a transport stream; and
    effecting delivery of the transport stream to the device outside of the conference location.

12. The method of claim 1 further comprising:
capturing audio content from the conference location;
generating audio source information bearing on a source of select audio of the audio content; and
effecting delivery of the at least select audio content of the audio content and the audio source information to the device outside of the conference location with the at least one higher quality encoded video stream and the at least one lower quality encoded video stream.

13. The method of claim 1 wherein as different ones of the plurality of image areas are identified as being active during a conference session, corresponding ones of the plurality of video streams are encoded at the higher quality level, and those ones of the plurality of video streams that are associated with ones of the plurality of image areas that are not identified as being active are encoded at the lower quality level.

14. A method comprising:
capturing video content of a plurality of image areas in a conference location from a plurality of cameras;
generating composite video content from the video content of the plurality of image areas, the composite video content comprising a plurality of image windows, each of which including video content from one of the plurality of image areas;
identifying at least one active image area of the plurality of image areas; and
encoding the composite video content using scalable video coding (SVC) to provide an encoded video stream having at least a lower SVC layer and a higher SVC layer wherein:
the lower SVC layer includes base information from which the composite video content can be reconstructed at a lower quality level, and the higher SVC layer includes supplemental coding information for a selected portion of the composite video content that corresponds to at least one image window of the plurality of image windows in which video content of the at least one active image area is provided;
the supplemental coding information is configured such that, when used with the base information, the selected portion of the composite video content may be reconstructed at a higher quality level when the encoded video stream is decoded; and
effecting delivery of the encoded video stream to a device outside of the conference location.

15. The method of claim 14 wherein the higher SVC layer does not include supplemental coding information that would allow the video content of portions other than the selected portion of the composite video content to be reconstructed at the higher quality level.

16. The method of claim 14 wherein as the at least one active image area changes from a first active image area to a second active image area, the selected portion of the composite video content changes from a first selected portion of the composite video content that corresponds to at least a first image window of the plurality of image windows in which video content of the first active image area is provided to a second selected portion of the composite video content that corresponds to at least a second image window of the plurality of image windows in which video content of the second active image area is provided.

17. The method of claim 14 wherein the selected portion of the composite video content is substantially fixed and the composite video content is generated such that video content from the at least one active image area is provided in a primary image window of the plurality of image windows that corresponds to the selected portion of the composite video content.

18. The method of claim 17 wherein as the at least one active image area changes from a first active image area to a second active image area, the primary image window that corresponds to the selected portion of the composite video content will change from providing video content of the first active image area to providing video content of the second active image area.

19. The method of claim 14 wherein the lower SVC layer consists of a base SVC layer that represents an independent sub-bit stream from which the composite video content can be reconstructed at the lower quality level.

20. The method of claim 14 wherein the lower SVC layer comprises a base SVC layer that represents an independent sub-bit stream from which the composite video content of the at least one active image area can be reconstructed and an enhancement layer that, when used with the base SVC layer, allows the composite video content of the at least one active image area to be reconstructed at the lower quality level.

21. The method of claim 14 wherein identifying the at least one active image area of the plurality of image areas comprises:
capturing audio content from the conference location; and
analyzing the audio content to select the at least one active image area.

22. The method of claim 21 wherein analyzing the audio content to select the at least one active image area comprises:
monitoring speech activity that is originating from the plurality of image areas; and
selecting as the at least one active image area the at least one of the plurality of image areas from which dominant speech activity is being received.

23. The method of claim 14 further comprising effecting delivery of at least select audio content to the device outside of the conference location with the encoded video stream.

24. The method of claim 23 wherein effecting delivery of the encoded video stream and the at least one lower quality video stream to the device outside of the conference location comprises:
encapsulating the encoded video stream and the at least select audio content in a transport stream; and
effecting delivery of the transport stream to the device outside of the conference location.

25. The method of claim 14 further comprising:
capturing audio content from the conference location;
generating audio source information bearing on a source of select audio of the audio content; and
effecting delivery of at least select audio content of the audio content and the audio source information to the device outside of the conference location with the encoded video stream.

26. A multi-view camera system comprising:
a plurality of cameras adapted to capture video content of a plurality of image areas in a conference location and provide a plurality of original video streams, wherein each of the original video streams corresponds to video content of a corresponding one of the plurality of image areas; and
circuitry associated with the plurality of cameras and adapted to:
identify at least one active image area of the plurality of image areas;
encode at a higher quality level at least one of the plurality of video streams that correspond to the at least one active image area using scalable video coding (SVC) to provide at least one higher quality encoded video stream;

encode at a lower quality level at least one other of the plurality of video streams that corresponds to at least one other image area using SVC to provide at least one lower quality encoded video stream; and effect delivery of the at least one higher quality video stream and the at least one lower quality video stream to a device outside of the conference location via a network interface.

27. The multi-view camera system of claim 26 wherein the at least one higher quality encoded video stream comprises:

a lower SVC layer comprising information from which the video content of the at least one active image area can be reconstructed at the lower quality level; and a higher SVC layer comprising supplemental coding information that, when used with information of the lower SVC layer, allows the video content of the at least one active image area to be reconstructed at the higher quality level.

28. The multi-view camera system of claim 27 wherein the at least one lower quality encoded video stream does not include supplemental coding information that would allow the video content of the at least one other of the plurality of video streams to reconstructed at the higher quality level.

29. A multi-view camera system comprising:

a plurality of cameras adapted to capture video content of a plurality of image areas in a conference location; and circuitry associated with the plurality of cameras and adapted to:

generate composite video content from the video content of the plurality of image areas, the composite video content comprising a plurality of image windows, each of which including video content from one of the plurality of image areas;

identify at least one active image area of the plurality of image areas; and encode the composite video content using scalable video coding (SVC) to provide an encoded video stream having at least a lower SVC layer and a higher SVC layer wherein:

the lower SVC layer includes base information from which the composite video content can be reconstructed at a lower quality level, and the higher SVC layer includes supplemental coding information for a selected portion of the composite video content that corresponds to at least one image window of the plurality of image windows in which video content of the at least one active image area is provided;

the supplemental coding information configured such that, when used with the base information, the selected portion of the composite video content may be reconstructed at a higher quality level when the encoded video stream is decoded; and effect delivery of the encoded video stream to a device outside of the conference location via a network interface.

30. The multi-view camera system of claim 29 wherein the higher SVC layer does not include supplemental coding information that would allow the video content of portions other than the selected portion of the composite video content to be reconstructed at the higher quality level.

31. The multi-view camera system of claim 29 wherein as the at least one active image area changes from a first active image area to a second active image area, the selected portion of the composite video content changes from a first selected portion of the composite video content that corresponds to at least a first image window of the plurality of image windows in which video content of the first active image area is provided to a second selected portion of the composite video content that corresponds to at least a second image window of the plurality of image windows in which video content of the second active image area is provided.

32. The multi-view camera system of claim 29 wherein the selected portion of the composite video content is substantially fixed and the composite video content is generated such that video content from the at least one active image is provided in a primary image window of the plurality of image windows that corresponds to the selected portion of the composite video content.

33. The multi-view camera system of claim 32 wherein as the at least one active image area changes from a first active image area to a second active image area, the image window that corresponds to the selected portion of the composite video content will change from providing video content of the first active image area to providing video content of the second active image area.

* * * * *